US006404963B1

(12) United States Patent
Dobson

(10) Patent No.: US 6,404,963 B1
(45) Date of Patent: Jun. 11, 2002

(54) METHOD OF MAKING LARGE CORE POLYMER FIBER OPTIC DEVICE

(75) Inventor: Paul J. Dobson, Charlton, MA (US)

(73) Assignee: Rofin Australia Pty. Ltd. (AU)

( * ) Notice: Subject to any disclaimer, the term of this patent is extended or adjusted under 35 U.S.C. 154(b) by 0 days.

(21) Appl. No.: 09/494,153

(22) Filed: Jan. 28, 2000

(51) Int. Cl.$^7$ .............................. G02B 6/16; G02B 6/02
(52) U.S. Cl. ................................. 385/123; 385/95
(58) Field of Search ................ 385/95–99, 123–125, 385/58

(56) References Cited

U.S. PATENT DOCUMENTS

| | | | | |
|---|---|---|---|---|
| 4,807,954 A | * | 2/1989 | Oyamada et al. | 385/43 |
| 4,900,114 A | * | 2/1990 | Mortimore et al. | 385/43 |
| 5,046,812 A | * | 9/1991 | Yanagi et al. | 385/96 |
| 5,369,721 A | * | 11/1994 | Conti | 385/115 |
| 5,898,802 A | * | 4/1999 | Chen et al. | 385/31 |

* cited by examiner

*Primary Examiner*—Hemang Sang-Havi
*Assistant Examiner*—Scott A Knauss
(74) *Attorney, Agent, or Firm*—R. William Reinsmith; Murtha Cullina LLP

(57) ABSTRACT

A method and a device are disclosed for reducing ultraviolet and infrared degradation of a polymer core of large core polymer fiber. The method comprises coupling a large core polymer fiber with a glass rod resulting in the placement of the glass piece in the path of the ultraviolet and infrared radiation, thus intercepting the same and keeping the polymer core from being degraded due to long term exposure to low densities of ultraviolet or infrared radiation or from being destroyed in applications involving high density exposure to such radiation. The device comprises a large core polymer fiber having a glass rod incorporated therein to prevent exposure of the core of the fiber to ultraviolet and infrared radiation.

9 Claims, 2 Drawing Sheets

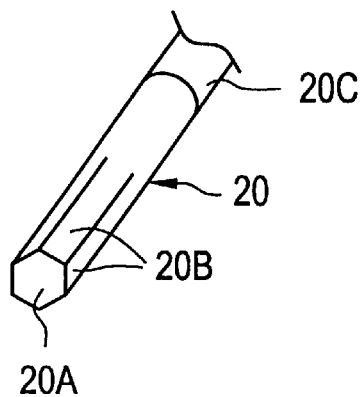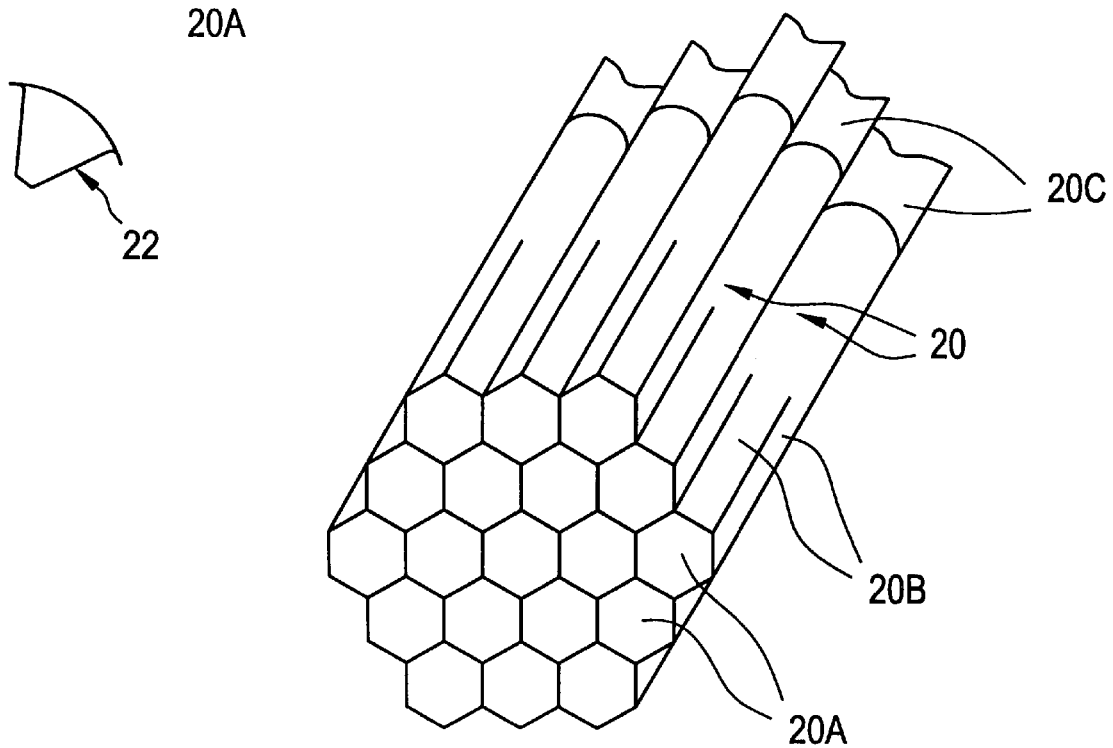

METHOD OF MAKING LARGE CORE POLYMER FIBER OPTIC DEVICE

FIELD OF THE INVENTION

The disclosed invention relates to optical fiber technology and, more particularly, to methods and devices for reducing or eliminating ultraviolet and infrared radiation degradation in a large core polymer fiber (LCP) such that it may be used with available light sources without modification of the light source.

BACKGROUND OF THE INVENTION

Optical fibers made from polymers are well known. These fibers are typically fabricated from various types of known polymers. These fibers are generally constructed of two major members, an optical polymer core and a cladding member which sheathes the polymer core. LCPs are a variation of polymer optical fibers.

The function of the optical core in an LCP is to transmit light. The transmitted light is typically supplied by a light source from one end of the optical fiber and travels down the fiber to the other end, or escapes from the sides of the optical fiber. The latter type of LCP is referred to as a "side light" fiber, and the former is referred to as an "end light" fiber.

Typically, the polymer cores of LCPs have circular cross sections having diameters that can range between 3 mm to 20 mm. Thus, LCPs can be manufactured with variable thicknesses making them useful in a variety of applications. LCPs are used in architectural applications such as lighting buildings, walkways, stairs and other areas where their functions range from aesthetic enhancement of an area to providing lighting for safety reasons. Generally, LCPs are useful in providing lighting to large areas because of their ease of installation and reasonable cost.

Because the core of LCPs are made from polymer fibers, when in use, LCPs degrade as a result of long term exposure to ultraviolet and infrared radiation emanating from their light sources. Since most light sources used with LCPs produce ultraviolet and infrared radiation, degradation in the polymer core of LCPs is a recurring problem. In some cases, degradation in the polymer core occurs in a matter of weeks after the installation, thus requiring replacement of the LCP.

In cases involving exposure of an LCP's core to high density ultraviolet or infrared radiation, degradation has been known to occur in a matter of moments. To resolve the problem of ultraviolet or infrared degradation, light sources that do not project ultraviolet or infrared radiation could be used in conjunction with LCPs. This approach is expensive and complicated in that it requires the use of a special technology.

The method herein disclosed takes a different approach to the problem in that instead of modifying the light source, the disclosed method makes it possible to modify the light that emanates from a common light source such that ultraviolet or infrared radiation will not be transmitted to an LCP's polymer core. Implementation of this approach involves the positioning and placement of a material that does not transmit ultraviolet and infrared radiation, but is optically transparent otherwise, such as a glass rod of a suitable shape and size, between a light source and the core of an LCP.

There are technological obstacles in the implementation of this approach which have to be overcome. Generally, the obstacles to be overcome relate to the proper coupling of an LCP's core with a glass rod as improper coupling may unduly reduce the efficiency of the light transmitted by the fiber.

The first problem to be overcome relates to light transmission efficiency from a light supplying member being coupled to the LCP's core. Light energy may be lost at the juncture between the coupling member that is transmitting light to the LCP's core, and the end of the LCP's core, if the light receiving end of the core is not properly finished. Coupling may be improper, thus causing inefficient transmission of light, if the cross section of the end of the core of an LCP, where light is received, is not flat and smooth. It is, therefore, imperative that the core's end be flat prior to coupling.

In addition, successful coupling requires substantial alignment of the members being coupled, and some way of insuring that the two members that are being coupled will not move apart. To keep such members in appropriate alignment, glue as well as mechanical devices conventionally have been used to effect proper coupling.

OBJECTS OF THE INVENTION

The methods disclosed herein overcome the above problems by providing steps for modifying an LCP to have a flat and smooth polymer core end, and through the same steps creating a means for receiving and maintaining another member in a substantially aligned position in respect to the end of the core.

A typical LCP is comprised of a polymer core and a cladding covering the same. Generally, the method of this invention involves the removal of a portion of the core of an LCP by heating slowly the LCP from the outside and from all directions at a preselected point along its length, and then stressing the core at a relatively high rate by pulling the core apart sharply. Through carrying out these steps at the appropriate temperatures and at an appropriate stress rate, the core of the LCP will fracture leaving a flat, smooth surface.

In addition, as part of the core is removed, a void is created within the tubular cladding of the LCP. A coupling member such as a glass rod may be then inserted in the void. Such member, if suitable in shape and dimensions, will be snugly received by the LCP that is modified through the methods disclosed herein as fingers of a surgeon are securely received by a surgical glove. As such the member will be positioned in substantial alignment with the end of the LCP core, and clinched in position by the cladding of the LCP upon insertion.

The methods disclosed in this application for the construction of a device to reduce ultraviolet and infrared degradation of the polymer core of an LCP may also improve the efficiency of an LCP so constructed by eliminating the need for polishing the end of an LCP which often leaves materials in the cladding that adversely affect the efficiency of the LCP.

Moreover, the novel methods herein disclosed may be practiced by a technician on-site to modify an existing system or in installation of new systems using known materials and instruments, thereby making the novel methods disclosed herein easy to adopt by the industry.

The methods disclosed in this application have the added advantage of being capable of implementation with very little cost and through the use of known and readily available materials, thus obviating the need to implement special manufacturing practices in the manufacturing of the LCPs themselves to produce ultraviolet and infrared resistive LCPs.

A typical device so constructed in accordance with this invention comprises an LCP which, through the modifications made possible by the methods disclosed herein, includes incorporated therein a glass member functioning to prevent the transmission of ultraviolet and infrared radiation to the polymer core. The glass member in such device may be further modified to provide other beneficial characteristics for the device itself.

Other objects will be in part obvious and in part pointed out more in detail hereinafter.

BRIEF DESCRIPTION OF THE DRAWINGS

FIG. 7 is a perspective view of a glass rod having one end of hexagonally shaped cross section merging with a rod portion of circular cross section, partly broken away; and FIG. 8 is an enlarged perspective view of a bundle of glass rods of a type shown in FIG. 7 showing the packing efficiency of such glass rods.

A better understanding of the objects, advantages, features, properties and relations of the invention will be obtained from the following detailed description and accompanying drawings which set forth certain illustrative embodiments and are indicative of the various ways in which the principles of the invention are employed.

DETAILED DESCRIPTION OF THE INVENTION

Referring now in detail to the drawings, a method is disclosed for joining an LCP with a coupling member, thus providing for a novel way to construct fiber optic devices with LCPs that are resistant to ultraviolet and infrared degradation. A preferable starting material would be an LCP. A typical configuration for such material is shown at 10 in FIG. 1.

Figure 1:
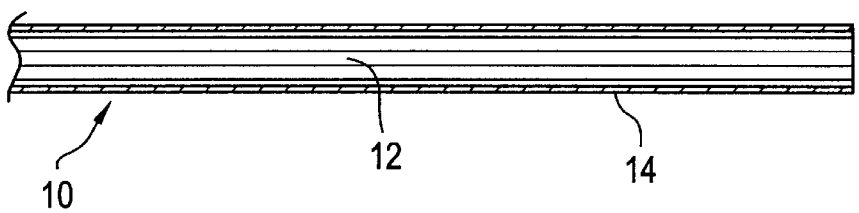
FIG. 1 is a cross sectional view of a typical LCP, partly broken away.

As shown in FIG. 1, a typical LCP 10 is made of a polymer core 12 and a cladding 14. The cladding 14 provides protection to the polymer core 12 against wear, and is necessary for effecting internal reflection of light, which helps the transmission of light through core 12.

In the case of LCPs, an LCP is manufactured by depositing an appropriate polymer, such as butyl methacrylate, in the cladding 14 and then heating the two to form a semisolid unit. Typically, an LCP's cladding 14 is made of material such as a fluropolymer that has a higher melting temperature than the core 12, thus making it possible for the core 12 to be heated to a temperature where it softens by the direct application of heat onto the cladding 14 from the outside of the LCP 10.

Figure 2:
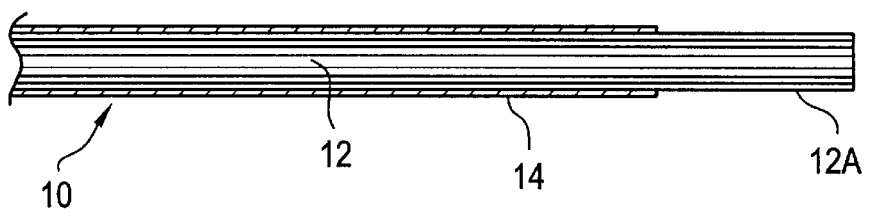
FIG. 2 shows the LCP of FIG. 1 with a portion of its cladding removed.

A preferred method for the practice of the invention herein disclosed involves stripping a portion of cladding away from one end 12A of core 12 of a typical LCP 10. FIG. 2 shows an LCP 10 whose end 12A has been stripped of cladding. In a preferred embodiment for the invention herein disclosed, about 12 mm of cladding 14 may be stripped away from the LCP 10 having about a 6 mm diameter core 12.

Another step in the practice of the invention involves applying heat to the LCP 10 at a location along the length of the LCP and spaced apart from end 12A of its core 12. The purpose of heating is to soften the polymer core. When the polymer core is made of butyl methacrylate, e.g., it may be heated to a temperature of at least 250° F.

Figure 3:
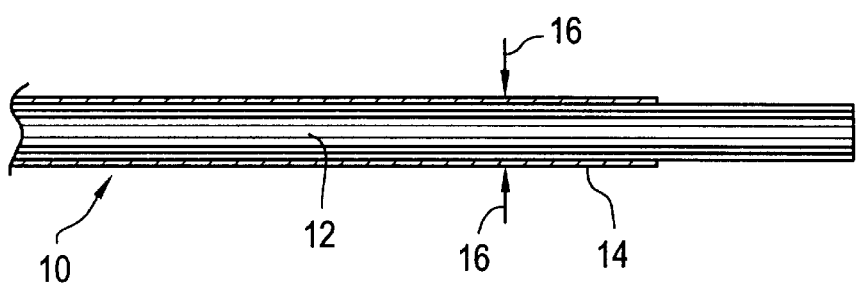
FIG. 3 demonstrates a point along the length of the LCP of FIG. 2, relative to the end of the LCP, where heat is applied to remove a portion of a polymer core.

The polymer core should be heated slowly from all directions as denoted by arrows 16 (FIG. 3) so that it will have a uniform temperature throughout the heated location. A preferred method for achieving uniformity is heating the LCP with a heating gun (not shown) while rotating the LCP about its longitudinal axis. Heating of the LCP should be confined to the shortest possible length for best results, typically about 12 mm to about 19 mm.

The polymer core 12 is then fractured in accordance with a further step of this invention which involves stressing the polymer core 12 at a high rate by causing it to be pulled apart very sharply upon grasping the LCP on opposite sides of the point or zone where it has been heated. To eliminate any possibility of damage to cladding 14, it may be cooled by wiping with a damp cloth (not shown) just prior to pulling on core 12. The rate of stressing the core must be high enough to avoid stretching the plastic core. By applying the appropriate stress rate, the polymer core 12 will not exhibit the high deformability that is normally associated with polymers; rather, it will behave in a brittle manner and fracture at the point where it has been heated. In addition, a resulting fracture surface 12B (FIG. 4) of the core will be flat and smooth without employing any finishing methods. The LCP so modified will be ideal for coupling with a light supplying member because the core fracture surface 12 with its flat, smooth face will efficiently receive light from such member.

Figure 4:
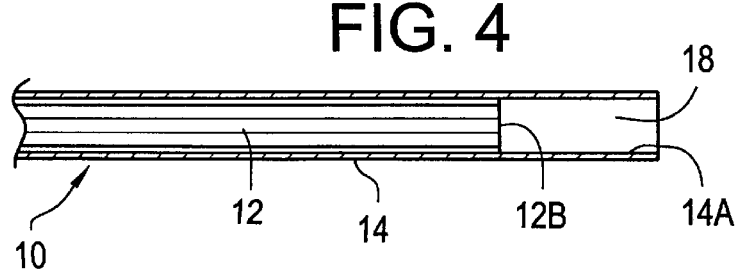
FIG. 4 shows the LCP of FIG. 3 after a portion of the polymer core is removed.
Figure 4A:
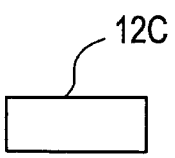
FIG. 4A is a side view of the portion of the polymer core removed from the LCP of FIG. 4.
Figure 5:
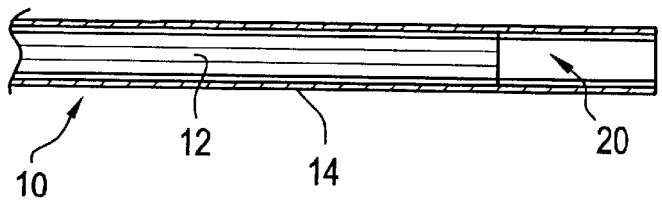
FIG. 5 shows the LCP of FIG. 4 with a glass rod inserted within its cladding in place of the removed polymer core.
Figure 6:
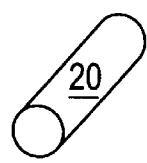
FIG. 6 is a perspective view of a typical glass rod.

After the fracturing step, a removable end portion 12C (FIG. 4A) of the polymer core 12 is removed, thus leaving a tubular void 18 defined by core fracture surface 12B and the wall 14A of cladding 14 extending to the right of surface 12B as seen in FIG. 4. A cylindrical optical glass plug or rod 20 (FIG. 5) is inserted into this void 18 within the cladding 14 far enough to be in contact with, or near, the fracture surface 12B of the core 12 in adjacent coaxially aligned end-to-end relation. The glass rod 20 may be from Schott type F and BASF families of optical glasses and may be secured in place by an adhesive or optical gel, not shown. Cyanoacrylate is an adhesive that has been found to work well. The surface 12B or end of the core 12 that is in contact with, or near, the glass rod 20 will be the light receiving end of the polymer core 12. Given that optical glass has an intrinsically low energy transmission in ultraviolet wavelengths and also absorbs much of infrared radiation from light sources, the LCP's core 12 is protected by the optical glass member 20 and will not be damaged as would an unprotected LCP exposed to such radiation.

The glass rod 20 may be cladded or uncladded and should be of suitable transverse cross section to fit within the void 18 inside cladding wall 14A and also cover the fracture surface 12B of the core 12 adequately. Moreover, glass rod 20 may be modified in order to add other features to the LCP 10. To further reduce the exposure of the polymer core 12 to infrared radiation, one or both ends of the glass rod 20 may be coated with infrared reflective material through a process that is generally known as hot coating. A hot coated glass rod 20 will reflect infrared radiation back to a light source, thus further protecting the LCP's core 12 and preventing its degradation without requiring modification of the light source.

Another added advantage of the disclosed method is the elimination of conventional polishing of the light receiving end of an LCP. LCPs normally are manufactured by depositing one kind of polymer inside another tubularly shaped polymer member, and then heating the two together until the inner polymer becomes a semi-solid. As a result of this process, the outer polymer, namely, the cladding, is not intimately attached to the interior semi-solid polymer, namely, the polymer core.

To finish a conventional LCP before use, the end of an LCP is commonly polished. Because the core and the cladding of conventional LCPs are not intimately attached, the polishing material used in the polishing process is sometimes forced in between the core and the cladding. The presence of such material—removal of which is nearly impossible—causes contamination of the LCP which then functions less efficiently. Insertion of a prepolished glass member 20 in accordance with this invention thus improves the light transmission efficiency of LCP 10 by eliminating the necessity for polishing the end of the LCP 10.

To improve the quality of the light transmission by LCPs, the shape of the glass rods 20 may also be modified. Typically, the transverse cross section of an LCP such as at 10 in FIGS. 1–5 will be understood to be circular. When many LCPs are bundled together as an assembly to receive light, much of the light is not transmitted by the LCP bundle because of commonly encountered inefficient packing of such conventional LCPs of circular cross section. Better packing would provide more surface area for receiving light from a light source, and thus improve the efficiency of light transmission by the bundle. Efficient packing of those ends of the LCPs may be achieved by modifying the shape of the light receiving ends of glass rods of the bundled LCPs.

More specifically, FIG. 7 shows an embodiment of such a glass rod 20. One end, namely, the light receiving end 20A of a glass rod insert may have a suitable polygonal cross section providing flat longitudinally extending sides such as at 20B. In FIG. 7, the glass rod insert is shown having a hexagonal transverse cross section, although it will be appreciated that other shapes also may prove to be useful such as pentagonal, square or triangular cross sectional shapes. As shown, the rod end 20A of polygonal cross section coaxially merges with rod portion 20C of circular transverse cross section. In the preferred embodiment, the cross sectional dimensioning of the light receiving end 20A is chosen such that it will encompass the circular rod portion 20C. Thus, while the dimension between opposite faces of the hexagonal rod portion, e.g., is equal to the diameter of the rod portion 20C of circular cross section, the cross sectional area of this hexagonal end 20A is larger than the rod portion 20C of circular transverse cross section. As shown in FIG. 8, use of a glass rod 20 so embodied allows better packing of a bundle of LCPs constructed through the method disclosed herein, and also increases the area that is exposed to light emanating from a light source, such as shown at 22 (FIG. 7), thus improving the efficiency of light transmission by such an assembly of bundled LCPs.

The glass rods 20 also may be colored thus eliminating the necessity of a colored light source or LCPs with colored polymer cores for use, for example, in architectural designs.

A variation of the method disclosed herein may be practiced on site by a field technician. A technician may carry out the steps herein disclosed, but taking care to select a prepolished glass rod 20 that is shorter in length than the length of the void 18 in the cladding 14, placing the glass rod 20 in position, and simply removing the excess cladding 14 to make the end of the glass rod 20 flush with the end of the cladding 14. The glass rod 20 may be secured in place by an adhesive or optical gel. Thus, existing LCP lighting systems may be modified on-site to become ultraviolet and infrared resistant without the necessity of costly replacements.

A device constructed in accordance with this invention comprises an LCP 10 modified through the methods disclosed herein and having a glass rod 20 inserted in a void 18 at one end of its cladding 14.

Although this invention has been illustrated and described with respect to exemplary embodiments thereof, it should be understood by those skilled in the art that various changes, omissions and additions may be made without departing from the spirit and scope of the invention.

I claim:

1. A method for joining a large core polymer fiber with a coupling member such as a glass rod and comprising the steps of providing a longitudinally extending large core polymer fiber having a polymer core and cladding surrounding the polymer core, the cladding having a higher melting temperature than the polymer core;

heating the large core polymer fiber at a preselected point along its length thereby causing the polymer core to reach a substantially uniform temperature and soften at the preselected point;

fracturing the polymer core at the preselected point by pulling the polymer core apart sharply thereby causing the polymer core to be stressed at a high rate at the preselected point, the fracturing step resulting in a removable core portion and a remaining core portion disposed within the cladding with the remaining core portion having a smooth, flat end formed by a fracture surface resulting from the fracturing step;

removing the removable core portion to create a void in the cladding of the large core polymer fiber; and inserting a coupling member in the void.

2. A fiber optic device constructed by the method of claim 1.

3. The fiber optic device of claim 2 wherein the coupling member is a rod formed of optical glass.

4. A method for making a fiber optic device to reduce ultraviolet and infrared degradation of a polymer core of a large core polymer fiber involving modification of a large core polymer fiber and comprising the steps of providing a longitudinally extending large core polymer fiber including a polymer core and a cladding covering the polymer core, the cladding having a higher melting temperature than the polymer core;

heating the large core polymer fiber at a preselected point along its length to a uniform temperature and softening the polymer core at the preselected point;

stressing the polymer core at a high rate by pulling the polymer core apart rapidly thereby causing the core to fracture at the preselected point into two portions including a first portion of the polymer core removable from the cladding and a second portion remaining disposed in the cladding and characterized by having an end with a smooth, flat surface;

removing the first removable portion of the core thereby creating a void in the large core polymer fiber having an end coinciding with the end of the large core polymer fiber; and inserting a glass rod in the void to prevent ultraviolet and infrared radiation reaching the core from a light source.

5. The method of claim 4 wherein the heating step includes heating a polymer core made of butyl methacrylate to a temperature of at least 250° F. within a floropolymer cladding.

6. The method of claim 4 further comprising the step of rotating the large core polymer fiber about its longitudinal axis during the heating step to enhance the uniformity of the temperature in the polymer core at the preselected point.

7. The method of claim 4 wherein the inserting step includes inserting a glass member having coated thereon infrared reflective material to prevent entry of infrared light into the glass member.

8. The method of claim 4 wherein the inserting step includes inserting a glass member having at least one prepolished end.

9. The method of claim 4 including the further steps of stripping cladding from one end of the large core polymer fiber before the heating and stressing steps and dampening the cladding at the preselected point after the heating step for cooling the cladding before the stressing step.

* * * * *